Sept. 29, 1925.
E. W. JOHNSTON
WINDOW WASHER AND DRIER
Filed Nov. 19, 1923
1,555,417
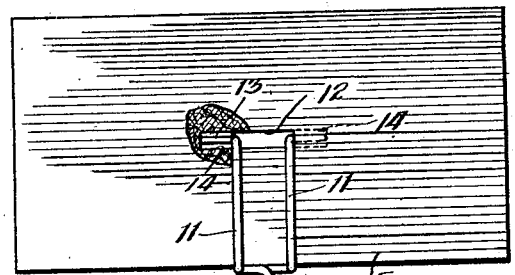
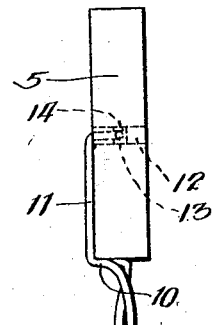
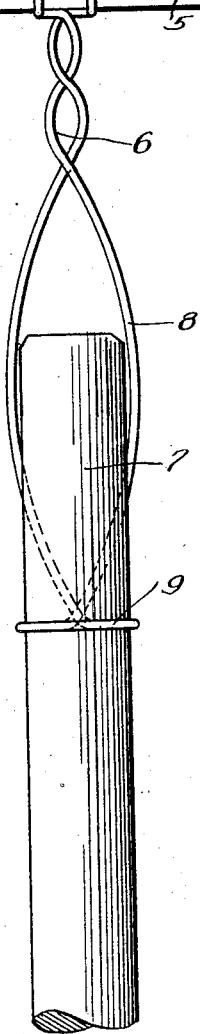
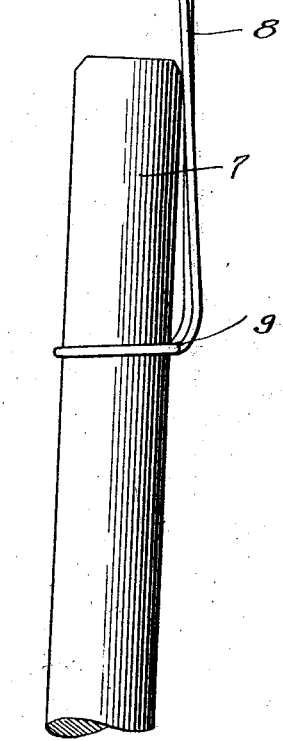
Fig. 1.
Fig. 2.
Inventor
Edward W. Johnston Patented Sept. 29, 1925.

1,555,417

UNITED STATES PATENT OFFICE.

EDWARD W. JOHNSTON, OF RIVER FOREST, ILLINOIS.

WINDOW WASHER AND DRIER.

Application filed November 19, 1923. Serial No. 675,585.

*To all whom it may concern:*

Be it known that I, EDWARD W. JOHNSTON, a citizen of the United States, residing at River Forest, in the county of Cook and State of Illinois, have invented certain new and useful Improvements in Window Washers and Driers, of which the following is a specification.

This invention relates to window washers and driers, and it has for its object providing suitable means for washing and wiping windows, and in general consists of a washer and wiper so arranged that either side can be used, and having a handle which can be held by the hand in operating the washer or is adapted to receive a long stick, if desired. Other objects of the invention will be apparent from the accompanying drawings and the following description thereof.

Of the drawings Fig. 1 is an elevation of the washer with the handle and stick attached and Fig. 2 is an edge view of the same.

The washer consists of a suitable block of felt 5 or other material which is supported by the hand handle 6 and, if desired, the stick 7 may be used to increase the length of the handle. The hand handle comprises the portion 8 which is adapted to be grasped by the hand and a ring portion 9 which is a continuation of the wire of the handle 8 and is of suitable size for receiving the stick 7. The hand handle also comprises the shoulder 10 which is adapted to support the lower edge of the felt and to assist in holding the handle in place. There are also wires 11 passing from the shoulder 10 to the central portion of the felt and passing into an opening 12 through the felt. The wires 11 are suitably bent so as to provide prongs 13 which enter openings 14 in the felt. In this manner the handle 6 is held sufficiently firmly in place to enable the operator to manipulate the felt as desired. Inasmuch as in operation the handle presses the felt against the window the handle cannot come off from the felt while in operation.

However, when it is desired, the handle may be very easily removed by simply pulling the shoulder 10 outwardly from under the felt and pressing the wires 11 towards each other until the prongs 13 pass out of the openings 14. The felt may then be reversed on the handle, if desired, and the window wiped with the other side of the felt, or the felt may be washed and replaced very conveniently.

By the use of the ring 9 the stick 7 is held sufficiently firmly in the handle for all ordinary purposes. The ring 9 as formed is resilient and may be readily enlarged by springing the wires apart, and, hence, a stick of any ordinary size may be placed without permanently deforming the ring therein; and in order to manipulate the washer the end of the stick is pressed against the wires of the hand portion 8, tending to spread these wires and to cause them to grasp the end of the stick; and this also tends to tighten the ring 9 on the stick. So that in any ordinary operation the stick is held firmly by the handle.

I claim as my invention:

1. A window washer comprising a block of felt having an elongated opening through its central portion and having oppositely projecting openings extending into the felt from the ends of said elongated opening, and a handle comprising resiliently held prongs adapted to pass into said projecting openings, and a shoulder extending from the handle under the edge of said block.

2. A window washer comprising a washing element, and a handle, said handle being fixed to said washing element, a resilient ring fixed to the outer end of said handle and adapted to receive and clasp a stick, said handle and ring being composed of a continuous piece of resilient wire, and said handle comprising a loop positioned between said ring and the washing element, said loop being adapted to receive the end of the stick.

In testimony whereof, I hereunto set my hand.

EDWARD W. JOHNSTON.